United States Patent [19]

Layer et al.

[11] 4,069,195

[45] Jan. 17, 1978

[54] SUBSTITUTED DECAHYDROQUINOLINES AND THEIR USE AS ULTRAVIOLET LIGHT STABILIZER

[75] Inventors: Robert Wesley Layer, Cuyahoga Falls; Pyong-Nae Son, Akron, both of Ohio

[73] Assignee: The B.F. Goodrich Company, Akron, Ohio

[21] Appl. No.: 697,387

[22] Filed: June 18, 1976

[51] Int. Cl.$^2$ .................................................. C08J 3/20
[52] U.S. Cl. ..................... 260/45.8 NW; 260/45.95 P; 260/283 R; 260/800; 260/814
[58] Field of Search ............... 260/45.8 NW, 45.95 P, 260/283 R, 800, 814

[56] References Cited

U.S. PATENT DOCUMENTS

| | | | |
|---|---|---|---|
| 2,500,229 | 3/1950 | Arnold et al. | 260/45.8 NW |
| 2,500,597 | 3/1950 | Arnold et al. | 260/45.8 NW |
| 2,831,861 | 4/1958 | Wilde | 260/800 |
| 2,832,749 | 4/1958 | Harris | 260/45.8 NW |
| 2,998,468 | 8/1961 | Wilde | 260/800 |
| 3,083,181 | 3/1963 | Harris | 260/45.8 NW |
| 3,296,189 | 1/1967 | Eastman | 260/45.8 NW |
| 3,362,929 | 1/1968 | Kehe | 260/45.8 NW |
| 3,362,930 | 1/1968 | Kehe | 260/45.8 NW |
| 3,637,745 | 1/1972 | Heller et al. | 260/45.8 NW |
| 3,901,849 | 8/1975 | Dodson et al. | 260/45.8 NW |

*Primary Examiner*—Eugene C. Rzucidlo
*Attorney, Agent, or Firm*—Alan A. Csontos

[57] ABSTRACT

Novel substituted decahydroquinolines are prepared and used as ultraviolet (UV) light stabilizers for plastic materials subject to UV light degradation, particularly for polyolefins. Compositions containing the decahydroqinoline compounds exhibit excellent stability to UV light.

11 Claims, No Drawings

SUBSTITUTED DECAHYDROQUINOLINES AND THEIR USE AS ULTRAVIOLET LIGHT STABILIZER

BACKGROUND OF THE INVENTION

Polymeric materials and products made therefrom must exhibit resistance to degradation if they are to be successfully marketed. Degradation can be seen as a partial or total loss of structural integrity, a darkening or discoloration of the product, a loss of flexibility or resilience, or a combination of the above phenomena. These phenomena are promoted or catalyzed by air (oxygen), heat, and light, particularly ultraviolet light.

To protect polymeric materials, ingredients which can be collectively called stabilizers are admixed with the materials to prevent or inhibit degradation. These stabilizers work in diverse and complex ways, such that a compound which stabilizes against heat and oxygen degradation in a polymer may not stabilize against light degradation in the same polymer, or vice versa. Furthermore, a compound which acts as a stabilizer against oxygen degradation in one type of polymeric material may be relatively inactive in another type of polymeric material. Thus, compounds which are stabilizers are further classed as antioxidants, antiozonants, heat stabilizers, and ultraviolet (UV) light stabilizers, depending upon what type of stabilization they demonstrate. In many cases, to obtain optimum protection, a mixture of compounds, each specifically selected to afford maximum protection against a certain type of degradation, is often used.

The present invention is directed to a new class of UV stabilizers. The basic structure of this class is a substituted decahydropuinoline, exemplified in its simplest form as 2,2,4-trimethyldecahydroquinoline. The 2,2,4-trimethyl substituted compound is already known as an antioxidant for rubber, as disclosed in U.S. Pat. Nos. 2,831,861 and 2,998,468. Unfortunately, the compound is not an effective UV stabilizer for rubber. However, it has been unexpectedly discovered that 2,2,4-trimethyldecahydroquinoline is a very effective UV stabilizer for plastics. Furthermore, other novel substituted decahydroquinoline compounds have been prepared which are as good as or better UV stabilizers than the trimethyl substituted compound.

Other art in this area is as follows: U.S. Pat. Nos. 3,362,929; 3,362,930; 3,829,292; 3,901,849; 3,910,918; 3,939,164; and Published patent application Ser. Nos. B402,162 and B571,638; and British Pat. No. 999,806; and an article in the J. Amer. Chem. Soc., Vol. 60 (1938) at page 1458 et seq.

SUMMARY OF THE INVENTION

The invention is directed to a new class of ultraviolet (UV) light stabilizers having the structural formula

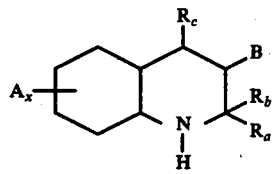

wherein $R_a$, $R_b$, and $R_c$ are each individually alkyl groups containing 1 to about 12 carbon atoms, cyclohexyl, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms, ester groups containing a total of from 2 to about 24 carbon atoms in the group, cyclohexyl groups, cyclohexylalkyl groups containing 7 to about 14 carbon atoms, hydroxy groups, and amino groups and aminoalkyl groups and alkyl-substituted amino and aminoalkyl groups wherein the alkyl contains 1 to about 12 carbon atoms; x is 0, 1, 2, or 3; and B is hydrogen, and alkyl group containing 1 to about 12 carbon atoms, a cyclohexyl group, or a cyclohexylalkyl group of 7 to about 14 carbon atoms.

Dimers of the above compounds can be prepared and are also part of the claimed invention. The dimer compounds are essentially two decahydroquinoline compounds of the above structural formula attached to each other at the 4-positions, the 6-positions, the 8-positions, the 4'-,6-positions, and the 4'-,8-positions on the molecule. An example of a dimer compound of the invention, in its simplest form, is 6-[4'-(2,2,4-trimethyldecahydroquinolyl)]-2,2,4-trimethyldecahydroquinoline.

Furthermore, bis compounds can be prepared and are also part of the claimed invention. The bis compounds are essentially two decahydroquinoline compounds of the above structural formula attached to each other through the 4-positions, the 6-positions, or the 8-positions via a bivalent radical structure selected from the group consisting of a bivalent alkyl structure and the structure

wherein G is —O—, —S—, >NH,

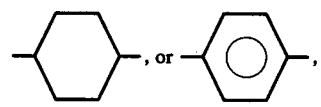

and y and z are individually an integer from 1 to 6. The alkyl can be linear or branched. An example of a bis compound of the invention, in its simplest form, is 6,6'-methylene-bis-(2,2,4-trimethyldecahydroquinoline).

The above compounds are ring-substituted decahydroquinolines. Polymeric plastic materials containing these compounds exhibit excellent stability to degradation caused by UV light. The substituted decahydroquinolines are particularly effectual as UV stabilizers for polyolefinic materials such as poly-α-monoolefin homopolymers. The decahydroquinoline compounds of the invention are beneficially used with phenolic antioxidants to provide both excellent UV and oxidative stability to plastic materials.

DETAILED DESCRIPTION

Substituted decahydroquinolines are very efficient and effectual ultraviolet (UV) light stabilizers for the protection of polymeric plastic materials subject to UV light degradation. The compounds have the structural formula

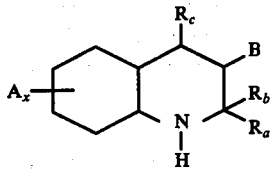

wherein $R_a$, $R_b$, and $R_c$ are each individually alkyl groups containing 1 to about 12 carbon atoms, cyclohexyl groups, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms, ester groups containing a total of from 2 to about 24 carbon atoms in the group, cyclohexyl groups, cyclohexylalkyl groups containing 7 to about 14 carbon atoms, hydroxy groups, and amino groups and aminoalkyl groups and alkyl-substituted amino and aminoalkyl groups wherein the alkyl contains from 1 to about 12 carbon atoms; $x$ is 0, 1, 2, or 3; and B is hydrogen, an alkyl group containing 1 to about 12 carbon atoms, cyclohexyl, or a cyclohexylalkyl group of 7 to about 14 carbon atoms.

Illustrative of the type of substituents that can be present on the decahydroquinoline compounds are: for $R_a$, $R_b$, or $R_c$, examples are methyl, ethyl, propyl, n-butyl, isobutyl, n-hexyl, 2-ethylhexyl, n-decyl, cyclohexyl, cyclohexylmethyl, 1-cyclohexylethyl, and the like; for A, when A is alkyl, examples are methyl, ethyl, n-propyl, n-butyl, tert-butyl, n-hexyl, 2-ethylhexyl, n-octyl, n-nonyl, n-decyl, n-dodecyl, n-tetradecyl, n-octadecyl, n-eicosyl, and the like; when A is hydroxyalkyl, examples are 2-hydroxyethyl, 2-hydroxypropyl, 3-hydroxypropyl, 4-hydroxybutyl, and the like; when A is alkoxy, examples are methoxy, ethoxy, butyloxy, octyloxy, and the like; when A is ester, examples are methylcarbonyloxyethyl, ethylcarbonyloxyethyl, ethylcarbonyloxypropyl, butylcarbonyloxyhexyl, octylcarbonyloxyhexyl, dodecylcarbonyloxyoctyl, and the like; when A is cyclohexylethyl, examples are cyclohexylmethyl, 1-cyclohexylethyl, and the like; when A is amino and the like, examples are amino, N-methylamino, N-ethylamino, diethylamino, dioctylamino, aminoethyl, N-methylaminoethyl, and. the like; and for B, examples are methyl, ethyl, propyl, n-butyl, n-hexyl, cyclohexyl, cyclohexylmethyl, and the like.

Examples of specific decahydroquinoline compounds are: 2,2,4-trimethyldecahydroquinoline; 2,4-diethyl-2-methyldecahydroquinoline; 2,4-diethyl-2-isopropyldecahydroquinoline; 2,4-methyl-2-hexyldecahydroquinoline; 2-methyl-2,4-dihexyldecahydroquinoline; 2-methyl-2,4-dicyclohexyldecahydroquinoline; 2,2-dimethyl-4-butyldecahydroquinoline; 2,2-diethyl-4-octyldecahydroquinoline; 2,2-dibutyl-4-methyldecahydroquinoline; 2,2,4,7-tetramethyldecahydroquinoline; 2,2,4-trimethyl-8-ethyldecahydroquinoline; 2,4-dimethyl-2-ethyl-8-nonyldecahydroquinoline; 2,2,4-trimethyl-6-cyclohexyldecahydroquinoline; 2,3,4-trimethyl-2-ethyldecahydroquinoline; 2,4-diethyl-2-methyl-6,8-diethyldecahydroquinoline; 2,2,4-trimethyl-6-hydroxyethyldecahydroquinoline; 2,2,4-trimethyl-6-ethoxydecahydroquinoline; 2,4-dimethyl-2-ethyl-6-butoxydecahydroquinoline; 2,2,4-trimethyl-5-ethylcarbonyloxyethyldecahydroquinoline; 2-methyl-2,4-dihexyl-6-hexylcarbonyloxydecyldecahydroquinoline; 2,4-diethyl-2-methyldecahydroquinoline; 2,2,4-trimethyl-7-cyclohexylmethyldecahydroquinoline; 2,2,4-trimethyl-6-hydroxy decahydroquinoline; 2,2,4-trimethyl-6,8-diaminodecahydroquinoline; 2,4-dimethyl-2-ethyl-6-(N-methylamino)decahydroquinoline; 2,2,4-trimethyl-6-(3'-aminopropyl)decahydroquinoline; 2,2,3,4-tetramethydroquinoline; 2,2,3-trimethyl-4-ethyldecahydroquinoline; 2,2-dihexyl-3-methyl-4-ethyldecahydroquinoline; 2,2,3,4-tetramethyl-6-butoxydecahydroquinoline; 2,2,3,4-tetramethyl-6,8-di(N,N-diethylamino)decahydroquinoline, and the like.

The more preferred substituted decahydroquinoline compounds are those wherein $R_a$, $R_b$, and $R_c$ are alkyl groups having 1 to about 12 carbon atoms; wherein A is alkyl, alkoxy, cyclohexylalkyl, aminoalkyl, or alkylamino; $x$ is 0, 1, or 2; and wherein B is hydrogen or an alkyl group having 1 to about 12 carbon atoms. Examples of there compounds are 2,2,4-trimethyldecahydroquinoline; 2-methyl-2,4-diethyldecahydroquinoline; 2-methyl-2,4-dihexyldecahydroquinoline; 2,2,4-triethyldecahydroquinoline; 2-ethyl-2,4-dihexyldecahydroquinoline; 2,2-dimethyl-4-ethyldecahydroquinoline; 2,2-diethyl-4-hexyldecahydroqyinoline; 2,2,4-trihexyldecahydroquinoline; 2,2,4,7-tetramethyldecahydroquinoline; 2,2,4-trimethyl6-ethyldecahydroquinoline; 2,2-diethyl-4-methyl-6-nonyldecahydroquinoline; 2,2,4-trimethyl-6-ethoxydecahydroquinoline; 2-ethyl-2,4-dimethyl-6-butoxydecahydroquinoline; 2,2,4-trimethyl-6-(N-methylamino)decahydroquinoline; 2-ethyl-2,4-dimethyl-5-(N,N-diethylamino)decahydroquinoline; 2,2,4-trimethyl-6-cyclohexylmethyldecahydroquinoline; 2,2,4-trimethyl-8-(1'-cyclohexylethyl)decahydroquinoline; 2,2,3,4-tetramethyldecahydroquinoline; 2-ethyl-2,3,4-trimethyldecahydroquinoline; 2-isobutyl-2,4-dimethyl-3-isopropyldecaydroquinoline; 2-methyl-2,4-hexyl-3-ethyldecahydroquinoline; 2-ethyl-2,3,4-trimethyl-6-ethoxydecahydroquinoline; 2,2,3,4-tetramethyl-6-(3'-aminopropyl)-decahydroquinoline; and the like.

Most preferred are those decahydroquinoline compounds wherein $R_a$, $R_b$, and $R_c$ are alkyl groups of 1 to about 8 carbon atoms, A is an alkyl group of 1 to about 10 carbon atoms, $x$ is 0, 1, or 2, and B is hydrogen or a methyl or ethyl group. Examples of such compunds are given in the above listing. Excellent results have been obtained when using 2,2,4-trimethyldecahydroquinoline; 2,2,3,7-tetramethyldecahydroquinoline, 2-methyl-2,4-diethyldecahydroquinoline, 2-methyl-2,4-dihexyldecahydroquinoline, and 2,2,4,8-tetramethyldecahydroquinoline.

The substituted decahydroquinolines can be prepared by various methods. One particularly good method comprises a two-sep process involving, first, the condensation reaction of an aromatic amine such as aniline or a ring-substituted aniline with a ketone or mixture of ketones to prepare a dihydroquinoline which is then hydrogenated in the presence of a metal catalyst to yield the decahydroquinoline. A process to prepare the dihydroquinoline is disclosed in U.S. Pat. Nos. 3,829,292 and 3,910,918, and in J. Amer. Chem. Soc., Vol. 60 (1938) at pages 1458 et seq. Dihydroquinoline dimer products can also be prepared in the same reaction. A process of hydrogenating the dihydroquinoline to yield the decahydroquinoline is disclosed in U.S. Pat. Nos. 2,831,861 and 2,998,468.

As previously mentioned, dimer compounds and bis compounds of the novel substituted decahydroquinolines can also be prepared and used as effective UV stabilizers. The dimer and bis products are readily prepared by hydrogenation of the unsaturated quinoline dimer or bis compound. For example, 6-[4'-(2,2,4-trimethyl-1,2-dihydroquinolyl)]-2,2,4-trimethyl-1,2-dihydroquinoline, which is the dimer of 2,2,4-trimethyl-1,2-dihydroquinoline (TMDQ) and which is prepared in small quantities as a by-product in the preparation of TMDQ, can be hydrogenated using a metal catalyst to yield a dimer compound of this invention, i.e., 6-[4'-(2,2,4-trimethyldecahydroquinolyl)]-2,2,4-trimethyldecahydroquinoline. As a further example, in the article by D. Craig in the J. Amer. Chem. Soc., Vol. 60 (1938), page 1458 et seq., the author prepared the material 6,6'-methylene-bis-(2,2,4-trimethyl-1,2-dihydroquinoline). This material can be hydrogenated using a metal catalyst to yield a bis compound of this invention, i.e., 6,6'-methylene-bis-(2,2,4-trimethyldecahydroquinoline). Other examples of dimer and bis compounds of the invention are 4-[4'-(2,2,4-trimethyldecahydroquinolyl)]-2,2,4-trimethyldecahydroquinoline; 8-[4'-(2,2,4-trimethyldecahydroquinolyl)]-2,2,4-trimethyldecahydroquinoline; 1,2-bis[4-(2,2,4-trimetyldecahydroquinolyl)] ethane; 1,4-bis[6-(2-methyl-2,4-dihexyldecahydroquinolyl)] butane; 1,6-bis-[8-(2-methyl-2,4-diethyldecahydroquinolyl)] hexane; 1,6-bis-[4-(2,2,4-triethyldecahydroquinolyl)]hexane; bis-[2-(2,2-dimethyldecahydroquinolin-4-yl)ethyl]ether; bis-[4-(2-methyl-2-ethyldecahydroquinolin-4-yl)butyl]ether; bis[2-(2-methyl-2-ethyldecahydroquinolin-4-yl)ethyl]sulfide; bis[2-(2,2-dimethyldecahydroquinolin-4-yl)ethyl]amine; 1,4-bis-[(2,2-dimethyldecahydroquinolin-4-yl)methyl]-cyclohexane; 1,4-bis[2-(2,4-dimethyl-2-ethyldecahydroquinolin-6-yl)ethyl] benzene, and the like.

Detailed procedures to prepare the novel substituted decahydroquinolines of the invention are given in the Examples.

The decahydroquinoline compounds of the invention are very efficient and effectual UV stabilizers for polymeric plastic materials that are subject to light degradation. The substituted decahydroquinolines are used in the plastic materials at a level of from about 0.05 part to about 10 parts by weight of compound per 100 parts by weight of the material. The use of over 10 parts by weight of the compound is not necessary to obtain the advantages of the invention. More preferably, the decahydroquinoline compounds are employed at a level of from about 0.1 part to about 5 parts by weight per 100 parts by weight of the plastic material.

Polymeric plastic materials that can be stabilized using the substituted decahydroquinolines include any plastic polymer that demonstrates degradation on exposure to light, such as by discoloration and/or embrittlement. Examples of such are polyurethanes, PVC resins, ABS resins, polystyrene, polyacrylonitrile, polymethacrylates, polycarbonates, varnish, phenol-formaldehyde resins, polyepoxides, polyesters, and polyolefin homo- and copolymers such as polyethylene, polypropylene, ethylene-propylene polymers, ethylene-vinyl acetate polymers, and the like. The decahydroquinoline compounds can also be used to stabilize mixtures and blends of plastic materials such as ABS resin blends, PVC and polymethacrylate blends, and plastic blends of polyolefin polymers.

The decahydroquinoline compounds of the invention are particularly useful as UV stabilizers for polyolefin homopolymers such as the poly-α-monoolefin homopolymers. The α-monoolefin monomers used to prepare the latter polymers include ethylene, propylene, isobutylene, 1-butene, 1-pentene, 1-hexene, 4-methyl-1-pentene, and the like. Excellent results have been obtained using the substituted decahydroquinoline compounds to stabilize polypropylene against UV degradation.

Many known compounding ingredients may be used along with the decahydroquinoline compounds in the compositions. Such ingredients include metal oxides such as zinc, calcium and magnesium oxide, fatty acids such as stearic and lauric acid, and salts thereof such as cadmium, zinc and sodium stearate and lead oleate; fillers such as calcium and magnesium carbonate, calcium and barium sulfates, aluminum silicates, asbestos, and the like; plasticizers and extenders such as dialkyl and diaryl organic acids like diisobutyl, diisooctyl, diisodecyl, and dibenzyl oleates, stearates, sebacates, azelates, phthalates, and the like; ASTM type 2 petroleum oils, paraffinic oils, castor oil, tall oil, glycerin, and the like; antioxidants such as 2,6-di-t-butyl paracresol, 2,2'-methylenebis-(4-ethyl-6-t-butyl phenol), 2,2'-thiobis-(4-methyl-6-t-butyl phenol), 2,2'-methylenebis-6-t-butyl-4-ethyl phenol, 4,4'-butylidenebis-(6-t-butyl-m-cresol), 2-(4-hydroxy-3,5-di-t-butylanilino)-4,6-bis(octylthio)-1,3,5-triazine, hexahydro-1,3,5-tris-η-(3,5-di-t-butyl-4-hydroxyphenyl)propionyl-s-triazine, tris-(3,5-di-t-butyl-4-hydroxybenzyl)isocyanuarate, tetrakismethylene-3(3',5'-di-t-butyl-4'-hydroxyphenyl)propionate methane, distearyl thiodipropionate, dilauryl thiodipropionate, tri(nonylphenyl)phosphite, tin thioglycolate, and the like; and other ingredients such as pigments, tackifiers, flame retardants, fungicides, and the like.

Compounding ingredients of particular interest to be used in the compositions of the invention are the antioxidant stabilizers. As the decahydroquinoline compounds of the invention are UV stabilizers, it is beneficial to add antioxidants to the compositions of the invention to achieve both UV light and oxygen stability of the compositions. The antioxidants are used in the range of from about 0.1 part to about 10 parts by weight, preferably from about 0.2 part to about 5 parts by weight per 100 parts by weight of the polymeric plastic. Of the types of antioxidants to be used, the phenolic antioxidants are preferred.

Examples of phenolic antioxidants are 2,6-di-t-butyl phenol; 2-methyl-4,6-dinonyl phenol; 2,6-di-t-butyl-p-cresol; 2,2'-methylenebis(4-methyl-6-t-butyl phenol); 1,1'-methylenebis(2-naphthol); 4,4'-methylenebis(2,6-di-t-butyl phenol); 4,4'-thiobis(6-t-butyl-m-cresol), and the like. Although any phenolic antioxidant used in combination with the decahydroquinoline compounds would better the heat and oxygen stability of the compositions, the more preferred phenolic antioxidants are those having alkylhydroxyphenyl substituents on an ester or a heterocyclic nucleus.

Examples of phenolic antioxidants having alkylhydroxyphenyl substituents on an ester nucleus are compounds of the formula

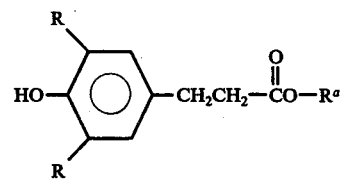

wherein R is hydrogen or an alkyl group of 1 to 9 carbon atoms, where at least one R must be an alkyl group, and $R^a$ is an alkyl group of 1 to 18 carbon atoms, exemplified by octadecyl 3-(3',5'-di-t-butyl-4'-hydroxyphenyl)propionate (see U.S. Pat. No. 3,330,859 for other examples); compounds of the formula

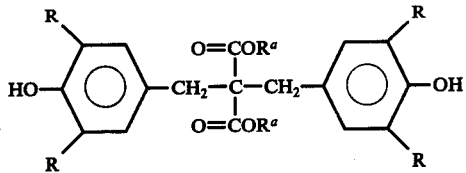

wherein R and $R^a$ are defined as above, exemplified by dilauryl α, α'-bis(3,5-di-t-butyl-4-hydroxybenzyl)malonate (see U.S. Pat. No. 3,627,725 for other examples); compounds of the formula

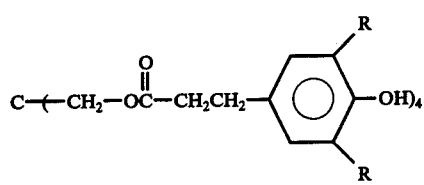

wherein R is defined as above, exemplified by tetrakis(-methylene-3-(3',5'-di-t-butyl-4'-hydroxyphenyl)propionate)-methane; and the like.

Examples of phenolic antioxidant compounds having alkylhydroxyphenyl substituents on a heterocyclic nucleus are compounds where the heterocyclic nucleus is a triazine nucleus such as compounds of the formula

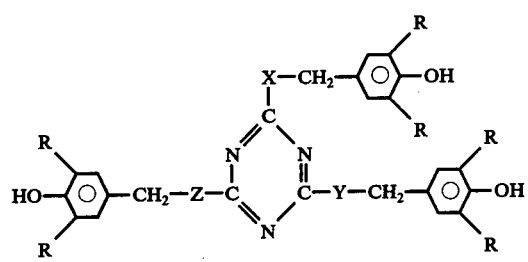

wherein X, Y, and Z are sulfur, oxygen, or nitrogen, and R is defined as above, exemplified by 2,4,6-tris(4-hydroxy-3,5-di-t-butyl benzylthio)-1,3,5-triazine (see British Pat. No. 977,589 for other examples); compounds of the formula

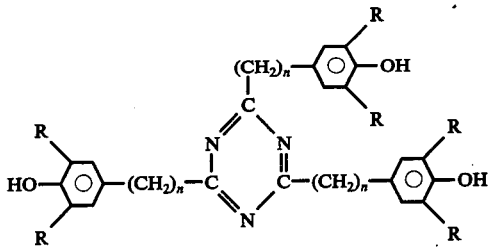

where R is defined as above, and n is 0 to 6, exemplified by 2,4,6-tris(3',5'-di-t-butyl-4'-hydroxybenzyl)-1,3,5-triazine (see U.S. Pat. No. 3,706,740 for other examples); compounds of the formula

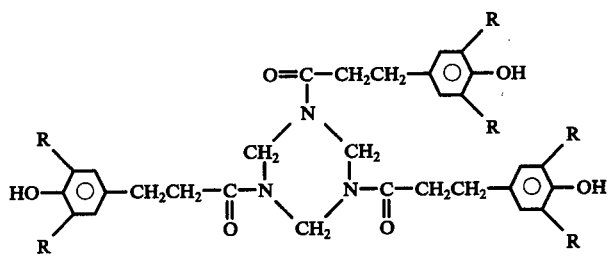

wherein R is defined as above, exemplified by hexahydro-1,3,5-tris-β-(3,5-di-t-butyl-4-hydroxyphenyl)propionyl-striazine (see U.S. Pat. No. 3,567,724 for other examples); compounds of the formula

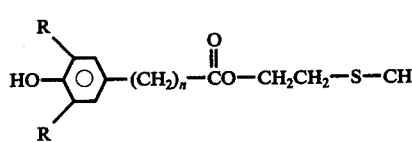

wherein R and n are defined as above, exemplified by 1,3,5-tris(4'-hydroxy-3',5'-di-t-butylphenylpropionyloxyethylthiopropiony)hexahydro-1,3,5-triazine (see U.S. Pat. No. 3,694,440 for further examples); and the like.

Examples of phenolic antioxidant compounds having alkylhydroxyphenyl substituents on an isocyanurate nucleus are compounds of the formula

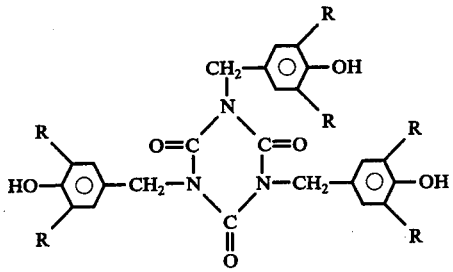

wherein R is defined as above, exemplified by tris-(3,5-di-t-butyl-4-hydroxybenzyl)isocyanurate (see U.S. Pat.

No. 3,531,483 for other examples); compounds of the formula

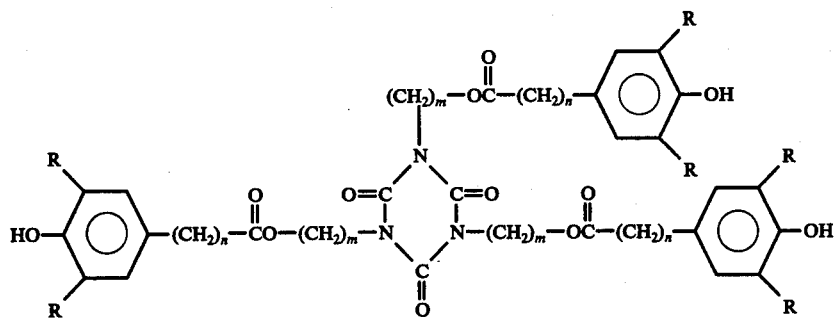

wherein R and N are defined as above, and m is 1 to 3, exemplified by 2,2′,2″-tris(3-(3,5-di-t-butyl-4-hydroxyphenyl)propionyloxy)ethyl isocyanurate (see U.S. Pat. No. 3,678,047 for further examples), and the like.

The combination of a decahydroquinoline compound and a phenolic antioxidant compound has particular utility for stabilizing polyolefinic polymers against degradation caused by heat, air (oxygen) and UV light.

The decahydroquinolines of the invention, and the other compounding ingredients if used, can be admixed with the polymeric plastic materials using known mixing techniques and equipment such as a Banbury mixer, a Henschel mixer, a two-roll mill, an extruder mixer, or other standard equipment. Standard mixing times and temperatures can be employed. The objective is to obtain intimate and uniform mixing of the components. A favorable mixing procedure to use when adding the decahydroquinoline compounds to a plastic is to either dissolve or suspend the compound in a liquid such as hexane or benzene, add the plastic material in the form of a powder to the solution or suspension, evaporate off the liquid, and extruder mix the stabilized plastic material prior to forming the product.

The UV stability of a particular composition containing a polymeric material and a substituted decahydroquinoline can be evaluated by exposing a prepared sample of the composition to Xenon or Carbon Arc light in a Weather-Ometer operating at a temperature, for example, of about 140° F. (60° C.). Degradation of the sample is followed by periodically measuring the carbonyl absorption band at 1720 cm$^{-1}$ using an IR Spectrophotometer. The rapid formation of carbonyl indicates failure of the sample. This test procedure is well known, and is published in the text *Photodegradation, Photo-oxidation and Photostabilization of Polymers* by Ranby and Rabek, John Wiley and Sons, N.Y., N.Y., (1975) at page 129 et seq., and is disclosed in U.S. Pat. No. 3,909,493. Failure of the sample is also checked by visual signs of cracking when the sample is bent 180°.

Samples of the composition can also be checked for oxidative and thermal stability by measuring the time to discoloration and/or embrittlement of the sample after aging in an air circulating oven at 140° C.

EXAMPLES

The following examples are given to further illustrate the invention. Exact procedures for the preparation of the decahydroquinoline compounds of the invention, preparation of sample compositions of the compounds, and polymeric materials, and exact test procedures and test results are disclosed.

PREPARATION OF THE SUBSTITUTED DECAHYDROQUINOLINES

The substituted decahydroquinolines of the invention are prepared by catalytically hydrogenating the appropriate unsaturated quinoline. The appropriate unsaturated quinoline in turn was prepared by a condensation reaction between aniline or a substituted aniline and two ketones which may or may not be the same.

A method of preparing the unsaturated quinoline is disclosed in detail in U.S. Pat. Nos. 3,829,292 and 3,910,918, which method is hereby incorporated by reference. Generally, the reaction is an acid-catalyzed condensation reaction between an aniline and two ketones which can be depicted as follows:

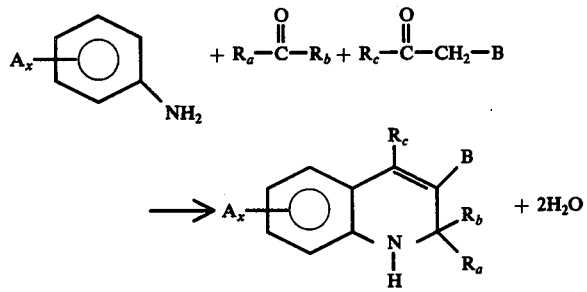

wherein $R_a$, $R_b$, $R_c$, A, B, and x are defined as first given above. This intermediate unsaturated quinoline is then heated in the presence of a metal catalyst and hydrogen to yield the completely saturated, substituted decahydroquinolines of the invention. As processes for preparing the unsaturated quinoline are known to the art, the following preparations will show the production of the substituted decahydroquinolines of the invention.

The metal catalysts useful to hydrogenate the unsaturated quinolines include reduced nickel, Raney nickel, rhodium preferably deposited on a support such as charcoal, ruthenium preferably deposited on a support such as charcoal, platinum oxide, and palladium preferably deposited on a support such as charcoal. The temperature of reaction is from about 20° C. to about 350° C. Times of reaction are from about 0.5 hours to 8 hours or more. High pressures, ranging up to 2000 psig, are characteristic of the process.

EXAMPLE I

Preparation of 2,2,4-Trimethyldecahydroquinoline 2,2,4-Trimethyl-1,2-dihydroquinoline (TMDQ) was obtained by the reaction between aniline and acetone. The chemical was a light yellow liquid having a boiling point of about 72° C. at 0.05 mm Hg.

The TMDQ prepared as above, 303 grams, was placed into a stainless steel autoclave along with 15 grams of Raney nickel. Hydrogen was then introduced into the closed autoclave to raise the internal pressure to 750 psig. The reaction mix was then heated to 220° C. while agitating the contents by shaking of the autoclave. Hydrogen was periodically introduced into the autoclave until the theoretical amount of hydrogen was taken up, about 3 hours. The reaction mix was then cooled and filtered to remove the catalyst. The chemical filtrate was analyzed by carbon, hydrogen, nitrogen analysis and mass spectrometry and NMR spectroscopy, and shown to be the desired 2,2,4-trimethyl-decahydroquinoline (a Perkin-Elmer Model 270 or duPont Model 21-490 mass spectrometer and a Varian A-60 NMR spectrometer were used). The product was 98.9% pure as determined by gas chromatography (a F and M Scientific Corp. Model 810 gas chromatograph using a 6 foot × 0.25 inch column packed with 10% OV-17 was used). The cis structure of the product was 91% as determined using an Infrared spectrometer and measuring the IR bands at 607 cm$^{-1}$ for the cis and 637 cm$^{-1}$ for the trans and comparing the measurements to standards. The assignment of the cis and trans isomers is a tentative assignment based upon data obtained in studying decaline and decahydroquinoline and related compounds. Relative cis and trans contents of the decahydroquinolines were determined using the baseline technique of infrared spectroscopy. The cis structure shows a medium band at 607 cm$^{-1}$ while the trans structure shows a larger band at 637 cm$^{-1}$, both bands due to the >N-H motion being non-planar. Furthermore, articles by B. Withop in the J. Amer. Chem. Soc., Vol. 70 (1948) at page 617 et seq. and by S. Mitsui et al in the J. of Catalysis, Vol. 30 (1975) at page 333 et seq. disclose the catalytic hydrogenation of closely related unsaturated products using certain specific metal catalysts such as platinum oxide or palladium yielded predominantly cis or trans isomers.

The above experiment was repeated using various catalysts and operating at different temperatures, pressures, and times. Results obtained were as follows:

1. Using 9.0 grams of a catalyst of 5% by weight of ruthenium on carbon and a reaction temperature of 220° C., 2,2,4-trimethyldecahydroquinoline of 98% purity and 94% cis structure was prepared in about 2.5 hours.

2. Using a catalyst of 3 grams of rhodium at 5% by weight on carbon and a reaction temperature of 200° C., 2,2,4-trimethyldecahydroquinoline of 98% purity and 96% cis structure was prepared in about 1.75 hours.

3. Using 5 grams of platinum oxide as the catalyst, operating at a temperature of 150° C. and employing 120 milliliters of glacial acetic acid as a reaction medium, 139 grams of TMDQ was reacted in about 5.5 hours to form 18.7 grams of 2,2,4-trimethyldecahydroquinoline having a 96% cis structure.

4. Using 12 grams of a Raney nickel catalyst and operating at a temperature of 200° C., in 3 hours, 2,2,4-trimethyldecahydroquinoline of 99% purity and 77 % cis structure was obtained.

5. Using 10.4 grams total of reduced nickel as the catalyst (Harshaw Ni-0104p) and operating at 200° C. over about 26 hours, 2,2,4-trimethyldecahydroquinoline having a 40% cis content was obtained.

EXAMPLE II

The dimer of 2,2,4-trimethyldecahydroquinoline was prepared by hydrogenation of the timer of the unsaturated quinoline. In the process of preparing 2,2,4-trimethyl-1,2-dihydroquinoline (TMDQ) an amount of the dimer product is also formed. This TMDQ dimer can be separated out of the TMDQ and itself used to prepare substituted decahydroquinolines of the invention. 6-[4'-(2,2,4-trimethyl-1,2-dihydroquinolyl)]-2,2,4-trimethyl-1,2-dihydroquinoline was obtained by distillation and separation of the chemical from the reaction mix of a 2,2,4-trimethyl-1,2-dihydroquinoline preparation. The chemical had a boiling point of 198° C. at 1.3 mm Hg. The chemical was placed in an autoclave with hydrogen and a catalyst of rhodium at 5% by weight on charcoal. Reaction temperature was 210° C. and internal pressure was 2000 psig. After 24 hours, the reaction mix was cooled down, the catalyst filtered out, and the liquid subjected to distillation. A liquid fraction boiling at 190° C. at 1 mm Hg was collected and analyzed. The IR spectra and NMR spectra of the liquid was consistent with the desired product, 6-[4'-2,2,4-trimethyldecahydroquinolyl)]-2,2,4-trimethyldecahydroquinoline. The calculated carbon, hydrogen, nitrogen content of the $C_{24}H_{44}N_2$ compound is 79.93% carbon, 12.30% hydrogen, and 7.77% nitrogen while the analyzed contents were 80.30% carbon, 12.43% hydrogen, and 7.63% nitrogen.

Similarly, other unsaturated hydroquinoline dimer and bis products can be hydrogenated to prepare the dimer and bis compounds of the invention. 6,6'-methylene-bis(2,2,4-trimethyl-1,2-dihydroquinoline), prepared following the procedure given in the article in J. Amer. Chem. Soc., Vol. 60 (1938) at page 1458 et seq., can be reacted with hydrogen in the presence of rhodium as the catalyst to yield 6,6-methylenebis-(2,2,4-trimethyldecahydroquinoline), a compound of the present invention.

EXAMPLE III 2-methyl-2,4-diethyl-1,2-dihydroquinoline, 250 grams, was placed in a reactor along with 3 grams of rhodium at 5% by weight on charcoal. Hydrogen was introduced to the reactor such that an internal pressure of 1000 psig existed at a reaction temperature of 190° C. Reaction time was 6 hours. The recovered product has an NMR spectra consistent with the desired product, 2-methyl-2,4-diethyldecahydroquinoline. The compound has a boiling point of 85° C. at 1 mm of Hg and was analyzed as 90% pure via vapor pressure chromotography. Carbon, hydrogen, nitrogen content for the formula $C_{14}H_{27}N$ is 80.31% carbon, 13.00% hydrogen, and 6.69% nitrogen and the analyzed values were 80.61% carbon, 13.47% hydrogen, and 6.35% nitrogen.

EXAMPLE IV

Following the procedure given in the preceding example, 65 grams of 2-methyl-2,4-dihexyl-1,2-dihydroquinoline was reacted with hydrogen in the presence of 2 grams of rhodium at 5% by weight on charcoal, at a temperature of 200° C. and a pressure of 1000 psig for 2.5 hours, to yield 2-methyl-2,4-dihexyldecahydroquinoline of 94% purity (as determined by vapor pressure chromotography). The product has a boiling point of 170° C. at 1 mm of Hg and has an NMR spectra consistent with the desired structure.

EXAMPLE V

Novel decahydroquinoline compounds were prepared having substituents at the 5, 7, or 8 positions on the ring in addition to the positions on the nitrogen-containing ring. These compounds are prepared from intermediate unsaturated quinolines which in turn were prepared using substituted anilines. For example, the use of p-methyl aniline in the intermediate reaction process results in an unsaturated quinoline having a methyl substituent at the 6-position, which material when hydrogenated would yield a decahydroquinoline having a methyl at the 6-position. Three different substituted decahydroquinolines were prepared.

2,2,4,5-Tetramethyldecahydroquinoline was prepared by reacting 133 grams of 2,2,4,5-tetramethyl-1,2-dihydroquinoline with hydrogen in the presence of 10 grams of a Raney nickel catalyst at a temperature of 200° C., a pressure of 1500 psig, and over a period of 2.5 hours. The desired product was confirmed by NMR spectral analysis and carbon, hydrogen, nitrogen analysis (calculated contents for $C_{13}H_{25}N$ of 79.93% carbon, 12.90% hydrogen, and 7.17% nitrogen and analyzed values of 79.28% carbon, 13.18% hydrogen, and 6.93% nitrogen). The product was 92% pure as determined by vapor pressure chromotography and boiled at 59° C. at 0.5 mm of Hg.

2,2,4,7-tetramethyldecahydroquinoline was prepared by reacting 125 grams of 2,2,4,7-tetramethyl-1,2-dihydroquinoline with hydrogen using 3 grams of rhodium at 5% by weight on charcoal as the catalyst and operating at 185° C., a 1000 psig pressure, for 24 hours. The desired product was confirmed by NMR spectral analysis and its carbon, hydrogen, nitrogen content (calculated contents for $C_{13}H_{25}N$ are the same as above and analyzed contents were 78.95% carbon, 13.30% hydrogen, and 6.80% nitrogen). The product was 95% pure as determined by vapor pressure chromotography and boiled at about 65° C. at 1 mmm of Hg.

2,2,4,8-Tetramethyldecahydroquinoline was prepared by reacting 74 grams of 2,2,4,8-tetramethyl-1,2-dihydroquinoline with hydrogen in the presence of 2 grams of rhodium at 5% by weight on charcoal at a temperature of 200° C., a pressure of 1000 psig, and over a period of 8 hours. The desired product was confirmed by NMR spectral analysis and carbon, hydrogen, nitrogen analysis (calculated content for $C_{13}H_{25}N$ is the same as above and analyzed contents were 80.03% carbon, 13.38% hydrogen, and 6.09% nitrogen). The product was 90% pure as determined by vapor pressure chromotography and boiled at 65° C. at 0.6 mm of Hg.

SAMPLE PREPARATION AND EVALUATION OF SUBSTITUTED DECAHYDROQUINOLINES

The substituted decahydroquinolines prepared in the preceding examples were evaluated as UV stabilizers for polymeric materials subject to light degradation. The evaluation was conducted by measuring the UV stability of compositions of unstabilized polypropylene and the decahydroquinolines on exposure to light from either a carbon arc or Xenon light source. The sample compositions evaluated contained a small level of a known antioxidant to allow for preparation and processing of the sample compositions without significant thermal and oxidative degradation occurring. The antioxidant used alone in the polypropylene had little effect on the UV stability of the composition.

Preparation of the sample compositions was as follows: Unstabilized polypropylene (Profax 6501 sold by Hercules, Inc.) in powder form was employed in the tests. The antioxidant and substituted decahydroquinolines were admixed with the polypropylene (PP) homopolymer at levels of 0.25 gram of antioxidant and 0.25 gram to 1 gram of decahydroquinoline compound per 100 grams of PP using the following procedure. The antioxidant and substituted decahydroquinoline wwere dissolved in 300 milliliters of a solvent such as benzene and then 200 grams of PP in powder form was added. The benzene was then evaporated of under reduced pressure and the resulting admixture then extruded using a Brabender extruder operating at 450° F. (232° C.) and at about 75 rpm. Sample compositions were obtained from the middle portion of the extrudate.

Test samples were prepared from the sample compositions by molding the compositions between aluminum plates at 420° F. (215° C.) using a pressing cycle of 1 minute heatup, 3 minutes under 20,000 psig molding pressure, and 4 minutes cool down. The molded test sheets, which were 10 to 20 mils thick, were cut into 2 inches by 1 inch strips and mounted for subsequent exposure to light.

The test samples were evaluated using an Atlas Model 60-W Weather-ometer operating at 140° to 150° F. (60° to 63° C.) using either a Carbon Arc or a Xenon light source. UV light degradation of the test sample compositions was measured by following the infrared absorption band of the sample at 1720 cm$^{-1}$, which band corresponds to carbonyl formation. A Perkin-Elmer model 467 IR Spectrophotometer was employed. This test procedure is disclosed in U.S. Pat. No. 3,909,493 and is published in the text, *Photodegradation, Photo-oxidation and Photostabilization of Polymers* by Ranby and Rabek, John Wiley and Sons, N.Y., N.Y. (1975) at page 129 et seq. In general, the test procedure involves the recordation of the initial absorbance ($A_o$) of the test sample at 1720 cm$^{-1}$ followed by periodic measurement of the 1720 cm$^{-1}$ band at subsequent exposure times ($A_t$). A plot of the change in the sample of absorbance ($A_t$-$A_o$) versus time will show a substantially linear portion wherein little or no change in absorbance occurs on exposure followed by a second substantially linear portion wherein rapid change of absorbance versus occurs. The point of intersection of a straight line drawn to each portion of the plot indicates the time at which rapid carbonyl formation initiates in the polymer plastic material (herein PP). Rapid carbonyl formation is evidence of UV initiated degradation of the test sample, which can also be correlated to visible signs of degradation such as darkening and discoloration and embrittlement of the sample. Time to failure of the test sample is taken to be the total time from initial exposure to the time of rapid carbonyl formation as determined by the above test method.

In addition to evaluating UV stability, the oxidative and thermal stability of many of the test samples were also measured. The test comprised heat aging test samples of the compositions in an air-circulating oven at 284° F. (140° C.) and measuring the time to complete embrittlement of the sample as evidenced by crumbling of the test sample.

EXAMPLE VI 2,2.4-trimethyldecahydroquinoline is an excellent UV stabilizer for polymeric plastic materials subject to degradation. In this example, 2,2,4-trimethyldecahydroquinoline and other alkyl-substituted decahydroquinolines were evaluated as UV stabilizers in polyproylene. The sample compositions were prepared following the procedue previously disclosed. Two series of experiments were run. In Series A, a small amount (0.25 part per 100 parts of PP) of antioxidant, Irganox 1010, tetrakis[methylene-(3,5-di-t-butyl-4-hydroxyhydrocinnamate)]methane, was included in each composition to prevent severe oxidative/thermal degradation from occurring in the preparation of the samples. The test samples were exposed to UV light from a carbon arc light in a Weather-Ometer operating at 150° F. (63° C.). In Series B, in one sample an alkylsubstituted decahydroquinoline was evaluated in PP without an antioxidant present. The remaining samples contained 0.25 part of Irganox 1010 per 100 parts of PP. The test samples were exposed to UV light from a Xenon light in a Weather-Ometer operating at 140° F. (60° C.). Results are given in the following table. All of the decahydroquinoline compounds exhibited excellent ability to provide protection for a material against UV light.

| Sample | Compound (level in parts/100) | Time to Failure (Hours) |
| --- | --- | --- |
| Series A | | |
| Control | — | Under 240 |
| A | 2,2,4-trimethyldecahydroquinoline (0.5) | 1360 |
| B | 2,2,4,6-tetramethyldecahydroquinoline (0.5) | 1170 |
| C | 2,2,4,7-tetramethyldecahydroquinoline (0.5) | 1100 |
| D | 2,2,4,8-tetramethyldecahydroquinoline (0.5) | 1260 |
| E | 2-methyl-2,4-diethyldecahydroquinoline (0.5) | 1170 |
| F | 2-methyl-2,4-dihexyldecahydroquinoline (0.5) | 1170 |
| Series B | | |
| Control | — | 620 |
| A[1] | 2,2,4,8-tetramethyldecahydroquinoline (0.5) | Over 1520 |
| B | 2,2,4,8-tetramethyldecahydroquinoline (0.5) | Over 1520 |
| C | 2-methyl-2,4-diethyldecahydroquinoline | Over 1520 |
| D | 6-[4'-(2,2,4-trimethyldecahydroquinolyl)]-2,2,4-trimethyldecahydroquinoline | 1300 |

[1]No Irganox 1010 present in composition

EXAMPLE VII

The alkyl-substituted decahydroquinolines can exist in either a predominantly cis structure or a mixture of cis and trans structures. It has been found that the cis structure is a better UV stabilizer than the trans form, particularly with the 2,2,4-trimethyldecahydroquinoline. The following sample compositions were prepared and evaluated following the procedures previously given. The test samples were exposed to UV light from a Xenon light in a Weather-Ometer operating at 140° F. (60° C.). Each sample contained 100 parts by weight of polypropylene and a small amount of a thermal/oxidative stabilizer, Irganox 1010, tetrakis [methylene-(3,5-di-t-butyl-4-hydroxyhydrocinnamate)] methane. Results, which are given in the following table, show that the cis-trans mixture was a poorer UV stabilizer than the high cis compound, even when the cis-trans mixture was used at twice the level. Thermal and oxidative aging tests were also conducted and the results shown.

| Sample | Irganox 1010 (Parts/100) | Compound (Parts/100) | Time To Failure (HOurs) | Oven Aging (Hours) |
| --- | --- | --- | --- | --- |
| Control | 0.5 | — | 600 | 2690 |
| 41% cis | 0.5 | 2,2,4-trimethyldecahydroquinoline (1.0) | 880 | 2470 |
| 96% cis | 0.25 | 2,2,4-trimethyldecahydroquinoline (0.5) | 100 | 2930 |

EXAMPLE VIII

The substituted decahydroquinoline compounds of the invention are excellent UV stabilizers for polyolefin plastics. The results in the following table show that these compounds are comparable to well known UV stabilizers in their ability to protect polypropylene from UV degradation. The sample compositions were prepared and evaluated as described in Example VII. Each sample contained 100 parts by weight of polypropylene, 0.25 part by weight of Irganox 1010, and 0.50 part by weight of UV stabilizer.

| Sample | UV Stabilizer | Time to Failure (Hours) | Oven Aging (Hours) |
| --- | --- | --- | --- |
| A | 2,2,4-trimethyldecahydroquinoline[a] | 1000 | 2930 |
| B1 | Tinuvin 328[b] | 980 | 2870 |
| B2 | Tinuvin 327[c] | 1380 | 3010 |

[a]96% cis structure
[b]2-(3',5'-di-t-amyl-2'-hydroxyphenyl)benzotriazole
[c]2-(3',5'-di-t-butyl-2'-hydroxyphenyl)-5-chlorobenzotriazole

EXAMPLE IX

In the previous Examples, the substituted decahydroquinolines of the invention have been shown to be effective UV stabilizers for polyolefin plastics. Although it is known that the specific compound 2,2,4-trimethyldecahydroquinoline is a useful antioxidant for rubber (see U.S. Pat. Nos. 2,831,861 and 2,998,468), it does not obviously follow that this compound and other such compounds would be effective UV stabilizers for rubbers or for plastics. For example, although the above-referenced patents disclose that 2,2,4-trimethyldecahydroquinoline is an antioxidant for rubber exposed to thermal/oxidative conditions, the following experiments show that this same compound is not a UV stabilizer for rubber.

A solution of unstabilized polyisoprene rubber at about 10% by weight in benzene was prepared. The compound was then added to a portion of the rubber solution at a level of 1 part of antioxidant per 100 parts by weight of rubber. The solution composition was then spread onto the surface of a KBr crystal and the benzene evaporated off to leave a film of the composition on the crystal. The composition was then examined using an infrared spectrometer to measure the initial absorption at 1720 cm$^{-1}$, indicative of a carbonyl band. The composition was then exposed to UV light from a GE sunlamp at a distance of 1 foot and the development of the carbonyl band at 1720 cm$^{-1}$ was periodically checked. Results of this testing, reported as increase of the carbonyl band with time, is given below. The data showed that the 2,2,4-trimethyldecahydroquinoline was not an efficient UV stabilizer for rubber. Additionally, a control sample containing no antioxidant was also included in the testing.

| Sample | Compound | Increase in 1720 cm$^{-1}$ Absorption Band (in Absorbance Units Using 0 Units as Initial Absorbance) | |
|---|---|---|---|
| | | At 3 hours | At 6 hours |
| Control | — | 0.09 | 0.48 |
| A | 2,2,4-trimethyldecahydroquinoline[a] | 0.05 | 0.53 |
| B | 2,2,4-trimethyldecahydroquinoline[b] | 0.05 | 0.422 |

[a]About 90 percent cis structure
[b]About 40 percent cis structure

We claim:

1. Compositions comprising (A) polymeric plastic materials subject to ultraviolet light degradation and (B) from about 0.05 part to about 10 parts by weight per 100 parts by weight of the plastic material of substituted decahydroquinoline compounds and the dimers thereof having the structural formula

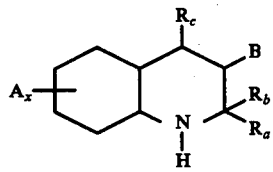

wherein $R_a$, $R_b$, and $R_c$ each independently are alkyl groups containing 1 to about 12 carbon atoms, a cyclohexyl group, or cyclohexylalkyl groups containing 7 to about 14 carbon atoms; A is selected from the group consisting of alkyl groups containing 1 to about 24 carbon atoms, hydroxyalkyl groups containing 1 to about 18 carbon atoms, alkoxy groups containing 1 to about 12 carbon atoms in the group, ester groups containing a total of from 2 to about 24 carbon atoms in the group, a cyclohexyl group, cyclohexylalkyl groups containing 7 to about 14 carbon atoms in the group, hydroxy groups, amino groups and aminoalkyl groups and alkyl-substituted amino and aminoalkyl groups wherein the alkyl contains 1 to about 12 carbon atoms; $x$ is 0, 1, 2 or 3; and B is hydrogen, an alkyl group containing 1 to about 12 carbon atoms, a cyclohexyl group, or a cyclohexylalkyl group of 7 to about 14 carbon atoms in the group; and, further, wherein the dimers of the above compounds are essentially two decahydroquinoline compounds of the above structural formula attached to each other at the 4-positions, the 6-positions, the 8-positions, the 4'-, 6'-positions, and the 4'-, 8-positions on the molecule.

2. A composition of claim 1 wherein (A) is a polyolefin polymer.

3. A composition of claim 2 where in (B) is a substituted decahydroquinoline compound wherein $R_a$, $R_b$, and $R_c$ are alkyl groups having 1 to 12 carbon atoms; A is alkyl, alkoxy, cyclohexylalkyl, alkylamino, or aminoalkyl; $x$ is 0, 1, or 2; and wherein B is hydrogen or an alkyl group having 1 to about 12 carbon atoms.

4. A composition of claim 3 where in (A) is a poly-α-monoolefin homopolymer and (B) is a substituted decahydroquinoline compound wherein $R_a$, $R_b$, and $R_c$ are alkyl groups of 1 to about 8 carbon atoms; A is an alkyl group of 1 to about 10 carbon atoms; $x$ is 0, 1, or 2; and B is hydrogen or a methyl or ethyl group.

5. A composition of claim 4 wherein (A) is polypropylene.

6. A composition of claim 5 wherein the substituted decahydroquinoline compound is selected from the group consisting of 2,2,4-trimethyldecahydroquinoline, 2,2,4,5-tetramethyldecahydroquinoline, 2,2,4,6-tetramethyldecahydroquinoline, 2-methyl-2,4-diethyldecahydroquinoline, 2-methyl-2,4-dihexyldecahydroquinoline, 2,2,4,7-tetramethyldecahydroquinoline, 2,2,4,8-tetramethyldecahydroquinoline, and 6-[4'-(2,2,4-trimethyldecahydroquinolyl)]-2,2,4-trimethyldecahydroquinoline.

7. A composition of claim 6 wherein the substituted decahydroquinoline compound is 2,2,4-trimethyldecahydroquinoline.

8. A composition of claim 1 where in (B) the decahydroquinoline compound is a bis compound wherein the bis compound is essentially two decahydroquinoline compounds of the structural formula in claim 1 attached to each other through the 4-positions, the 6-positions, or the 8-positions via a bivalent radical structure selected from the group consisting of a bivalent alkyl structure and the structure $(CH_2)_yG(CH_2)_z$, wherein G is —O—, —S—, <NH,

and $y$ and $z$ are individually an integer from 1 to 6.

9. A composition of claim 1 wherein the composition additionally contains antioxidants used in the range of from about 0.1 part to about 10 parts by weight per 100 parts by weight of the material.

10. A composition of claim 9 wherein the antioxidant is a phenolic antioxidant.

11. A composition of claim 10 wherein the phenolic antioxidants are those having alkylhydroxyphenyl substituents on an ester or a heterocyclic nucleus.

* * * * *